2,605,806

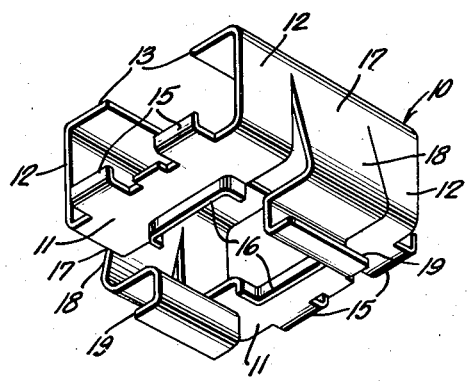
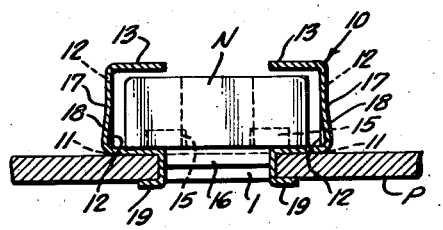
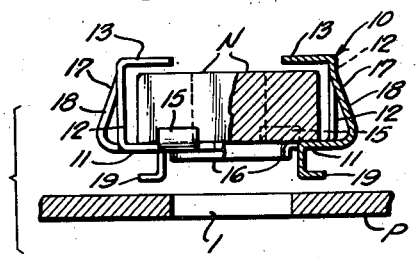
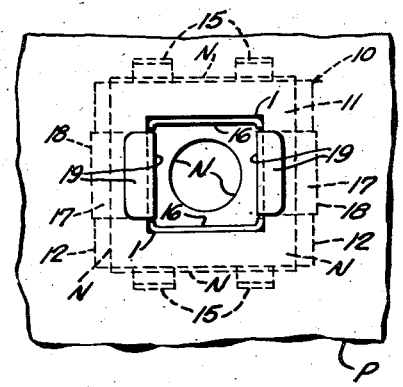
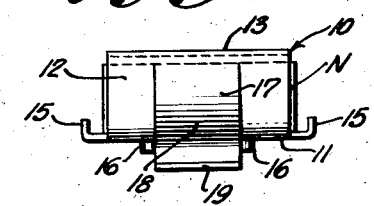

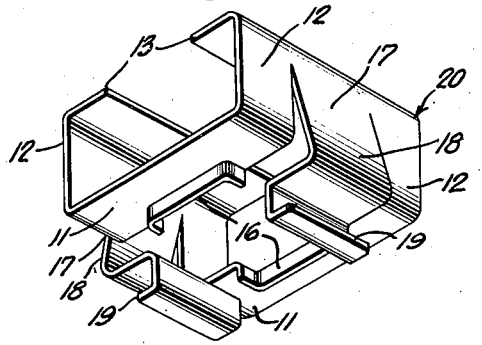
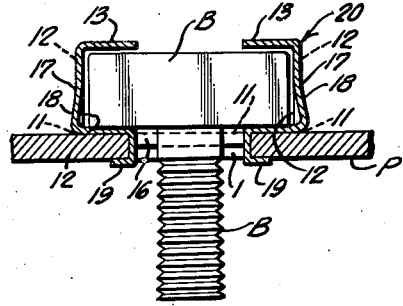
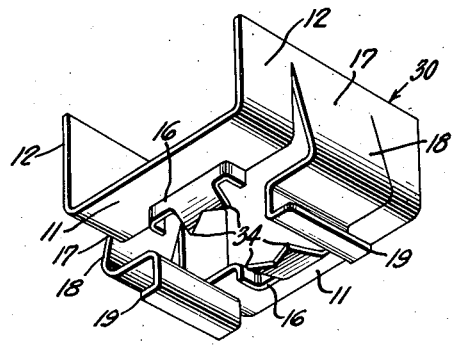
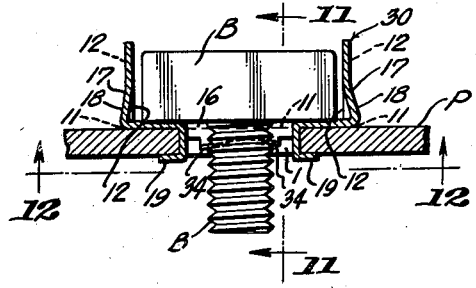
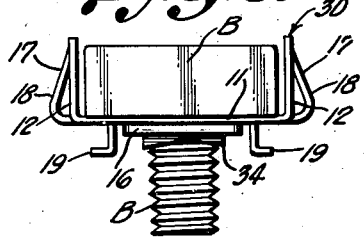
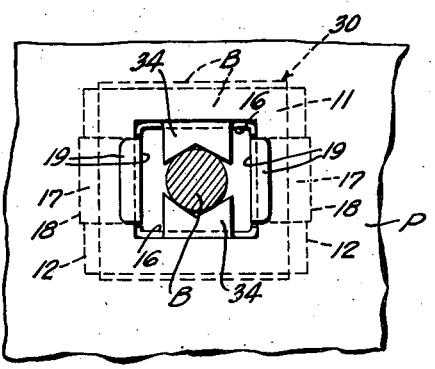
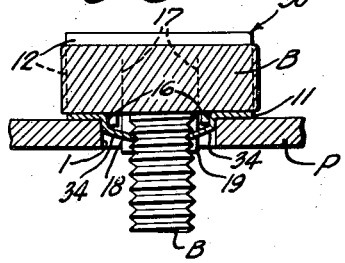
Inventor
GEORGE A. TINNERMAN Patented Aug. 5, 1952

UNITED STATES PATENT OFFICE 2,605,806

FASTENING DEVICE

George A. Tinnerman, Cleveland, Ohio, assignor to Tinnerman Products, Inc., Cleveland, Ohio, a corporation of Ohio Application July 26, 1948, Serial No. 40,711

2 Claims. (Cl. 151—41.75)

1

This invention relates in general to bolt and nut fastened installations and deals; more particularly, with improvements in holding devices for attaching standard nuts, bolts, screws, rivets, and similar studs in fastening position in an assembly prior to the application of a cooperating fastening device thereto for securing the parts of the assembly. The present application is a continuation in part of copending application Serial Number 672,947, filed May 29, 1946, now abandoned.

In many assemblies, it is necessary or desirable to use a standard nut and bolt fastening means but it is usually a difficult problem, especially in blind locations, for the operator to hold the bolt or nut in place as the cooperating fastener is applied, or otherwise, to maintain the same against rotation during the final tightening of the fasteners. In such an assembly in which the rearward side of a part is not conveniently or readily accessible for holding a bolt or nut in fastening position prior to the application of the cooperating fastener, it has been the practice to resort to various forms of cage devices requiring a welding or riveting operation for attaching the same in providing means for holding the nut or bolt in fastening position. A welding or riveting operation involves considerably increased costs in manufacture which often make the use of this type of holder prohibitive in many installations requiring a cheap and inexpensive fastening means. Welded or riveted holders otherwise are objectionable by reason of the inordinate amount of time required in the installation thereof and the lack of any provision for shifting of the bolt or nut in attached position to compensate for misalignment of the openings in the parts secured.

A primary object of this invention, therefore, is to provide an improved form of holder or retainer for a nut, bolt or other clamping member which is relatively simple and inexpensive to manufacture and includes in its construction a spring actuated type attaching means adapted for quick and easy clip or snap fastening application to attach the nut or bolt in fastening position in an installation in a minimum of time and effort.

A further object of the invention is to provide such holders for conventional or standard nuts and bolts in the form of a simplified sheet metal device having spring actuated hook type attaching means designed for clip or snap fastening attachment in an opening in a part to retain the bolt or nut against accidental removal or displacement while otherwise holding the same against turning as the associated fastener is threaded therewith and tightened.

2

Another object of the invention is to provide holders of the kind described which provide for shifting or adjustment of the attached fastener as necessary to compensate for misalignment in the bolt openings in the parts secured.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout the same, and in which:

Fig. 1 is an enlarged perspective view of a form of holder or retainer in accordance with the invention as provided for attaching a nut in fastening position on a supporting panel;

Fig. 2 is a side view, partly in section, showing the holder of Fig. 1 as assembled with a nut and in position to be attached in an assembling opening in a panel or other support;

Fig. 3 is an end view of the combined holder and nut shown in Fig. 2;

Fig. 4 is a sectional view showing the nut holder in attached position in the panel opening and retaining the nut in a floating mounting; and Fig. 5 is a bottom plan view of Fig. 4;

Fig. 6 is an enlarged perspective view of another form of the holder as provided for attaching a bolt in an opening in the supporting panel; and Fig. 7 is a sectional view showing the fastener of Fig. 6 as attached in the panel opening and holding the bolt thereon against relative turning.

Fig. 8 is a perspective view of another form of the holder as designed for attaching a bolt in a panel opening;

Fig. 9 is a view showing the nut holder of Fig. 8 in edge elevation and as assembled with a bolt to be attached in a panel opening;

Fig. 10 is a sectional view showing the assembled bolt and holder of Fig. 9 in attached position in a panel opening;

Fig. 11 is a sectional view of Fig. 10 along line 11—11, looking in the direction of the arrows; and Fig. 12 is a sectional view of Fig. 10 along line 12—12, showing the bolt holder in bottom plan view as attached in the panel opening.

Referring now, more particularly, to the drawings, Figs. 1-5 inclusive show a form of fastener 10 in accordance with the invention as provided for use as a holder or retainer for a nut. The fastener is constructed from a sheet metal section of a size and configuration determined by the shape and size of the nut with which it is to be used and may be readily designed for use with any type of nut or equivalent clamping member such as the head of the bolt. In the present example, the holder is shown as constructed for use with a standard square nut N to be attached over an opening in a panel P. Any suitable sheet metal may be employed for making the nut holder 10 but preferably that of a spring metal nature such as spring steel or cold rolled steel having spring like characteristics.

The sheet metal blank forming the nut holder 10 is bent to define a central base portion 11 having end portions thereof bent upwardly to define a pair of spaced arms 12 and inwardly bent flanges 13 conforming generally to the shape of the nut N but of larger size to provide for a floating mounting of the nut. On opposite sides of the base 11 between the side arms 12, stop elements are provided in any suitable manner, as by spaced lugs 15 which retain the nut between the side arms 12 with the inturned flanges 13 overlying the top of the nut to enclose the same within the nut holder. In general, the arrangement is such that the side arms 12 may be flexed apart as necessary to slip the nut through the space between the ends of the inturned flanges 13 to a position substantially as shown in Figs. 2 and 4, in which the holder retains the nut in the manner of a cage device defined by the side arms 12, inturned flanges 13 and lugs 15, as aforesaid.

The nut, as thus retained by the nut holder, has its threaded opening in line with an enlarged bolt passage in the base 11 of the holder but capable of considerable shifting or adjustment in any lateral direction between the arms 12 and lugs 15 as necessary to compensate for misalignment and other irregularities in the bolt openings in the parts to be secured.

The bolt passage in the base 11 of the nut holder is provided along with stamped or struck out attaching elements 15 for retaining the nut holder in attached position in the opening 1 in the supporting part P. As shown in Fig. 1, such a bolt passage is provided together with abutments 16, or the like, in the form of collar or hub sections bordering such bolt passage and projecting from the underside of the fastener base 11. These collar or hub sections 16 are designed in any form to correspond substantially to the contour of the panel opening. In the present illustration, the panel opening is of generally rectangular configuration and accordingly, said collar sections 16 comprise straight flat surfaces designed to be snugly received therein in nonrotatable abutting relation with opposing straight side walls of such rectangular panel opening.

The attaching means of the fastener comprise a pair of cooperating, yieldable spring fingers 17 or the like carried by the side arms 12 and these spring fingers preferably are provided by strip portions stamped from said arms 12 and the adjoining portions of the base 11. The spring fingers 17 thus provided are joined to the side arms 12 adjacent the inwardly bent flanges 13 and are bent in the general form shown in Fig. 2 to comprise outwardly inclined portions 18 which project outwardly out of the plane of the associated side arm 12 when the fastener is in normal untensioned condition as shown in Fig. 2. The free end portions of said spring fingers 17 are bent inwardly toward each other in the general plane of the fastener base 11 and are return bent to define outwardly bent hook elements 19, or other suitable shoulders which, in untensioned relation, are spaced apart a distance greater than the width of the panel opening 1 so as to engage wall portions thereof under tension. Said hook elements 19 otherwise are preferably provided in a predetermined size approximating the thickness of the panel adjacent the panel opening so as to clasp opposing marginal portions of the panel opening in snug, frictional engagement therewith.

The holder thus provided, and the nut N assembled therewith as shown in Fig. 2, is easily and quickly attached in the opening 1 in the panel P simply by compressing the outwardly inclined projecting portions 18 of the spring arms 17 to move the hooks 19 on the extremities thereof inwardly toward each other as necessary to pass through said opening. The fastener base 11 is simultaneously seated on the panel P with the flat abutments 16 in positive engagement with opposing straight side walls of the generally rectangular panel opening 1. The spring fingers 17 are then released from their compressed condition, and, in attempting to assume their initial outwardly inclined relation, force the hooks 19 to spread apart and thereby frictionally and grippingly engage the adjacent marginal portions of the panel opening, as shown in Figs. 4 and 5, to retain the holder in attached position.

The spring fingers 17 as thus attached do not assume their initial untensioned relation but rather, remain biased inwardly approximately in the planes of the arms 12 in the engaged position of the hooks 19 in the panel opening as seen in Fig. 4. Consequently, the spring fingers 17 exert a constant outward spring force on the hooks 19 in frictional, gripping engagement with the marginal portions of panel opening 1. This arrangement in many instances is sufficient to maintain the holder in attached position against relative turning on the panel when the bolt is threaded therewith and tightened. However, to insure positive resistance against any such relative turning of the nut holder in attached position, there are provided, preferably, the abutments 16 in snug surface engagement with the straight side walls of the generally rectangular panel opening 1, as aforesaid. In addition, the hook elements 19 preferably are so designed as to clasp the opposite sides of the panel adjacent the opening so that the holder is maintained against relative axial as well as relative rotative displacement in attached position.

Figs. 6 and 7 disclose a holder 20 having the same general construction, aforesaid, as provided for attaching a bolt B in nonrotative position in the panel opening 1. The bolt is assembled with the holder by slipping te bolt shank through the passage in the fastener base 11 and flexing the inturned flanges 13 apart as necessary to slip the bolt head between the side arms 12. Inasmuch as the bolt shank retains the bolt against lateral displacement in assembly with the holder, there is no need for stop elements on the fastener base so that this construction is further simplified by a straight edge design of the sides of the base 11. The holder in this form of the invention is provided with spring finger attaching means 17 which are similar to those described with reference to the fastener of Figs. 1–5 inclusive and which are applied in a similar manner to retain the bolt on the panel against both relative rotative and axial displacement.

Figs. 8–12 inclusive show another form of bolt holder 30 which includes an alternate arrangement for retaining the bolt against axial displacement and which otherwise is designed for assembly of the bolt therewith either prior to or after the holder is attached to the panel. The holder has the same general construction as the previously described forms of the invention but is further simplified in that the inturned flanges overlying the bolt head are omitted.

The bolt holder is provided with similar spring finger attaching means 17 and includes abutments 16 formed with integral cooperating tongues 34, or the like. These tongues are designed to engage the bolt shank in the manner of a clutch to permit passage thereof in one direction in the assembly of the bolt with the bolt holder but prevent reverse axial movement of the bolt shank toward disassembly from the holder. The bolt B may be assembled with the holder and thereby secured to part P, either before or after the bolt holder is attached in the panel opening in said part. Accordingly, with the bolt holder first attached in the panel opening as described with reference to Figs. 1-5 inclusive, the bolt shank is passed through the space between the tongues 34 and through the panel opening 1 to the position shown in Fig. 10 wherein the underside of the bolt head bears upon the fastener base 11 and opposing faces thereof are received between the side arms 12 in abutting relation therewith. During the axial movement of the bolt shank past the tongues 34, the extremities of said tongues ratchet over the bolt threads to a position adjacent the underside of the bolt head. In this position, the tongues bite into the bolt shank and prevent any reverse axial movement toward separation of the bolt from assembled relation with the bolt holder. Inasmuch as the bolt is held against relative turning by the side arms 12 in engagement with the side faces of the bolt head, the bolt in attached position shown in Fig. 10 is thus securely attached to the panel against relative rotative as well as relative axial movement. In the alternate method of attachment, the bolt is first assembled in a similar manner with the holder as shown in Fig. 9 and this assembly then attached to the panel as seen in Fig. 10 in the same general procedure described with reference to the fastener of Figs. 1-5 inclusive.

It will be appreciated that the holder in any form is admirably suited for blind fastening installations wherein a nut or the head of a bolt is not conveniently or readily accessible for the application of a tool as the associated fastener is applied and tightened. In this regard, the side arms 12 of the holder, in engaging the periphery of a bolt head, nut or other clamping member, serve as a coupling means with the attaching fingers 17 and abutments 16 to prevent any possible relative turning of the clamping member in attached position on the panel.

Additionally, the construction of the fastener in any form is such that the base 11 serves as a bearing washer under the nut or the head of the bolt or the clamping surface of any other clamp type of fastener, thereby dispensing with the need for washers and also lock washers which makes for considerable savings not only in the cost of these devices but also in the amount of labor and time in assembling operations.

While the invention has been described in detail with specific examples, such examples are intended as illustrations only inasmuch as changes in the construction and arrangement of the fasteners within the broad scope of the instant disclosure are fully contemplated.

What is claimed is:

1. An integral resilient sheet metal retainer for a nut or bolt head comprising a base adapted to seat against a surface of a support over an opening having a noncircular wall, opposed abutments projecting from the underside of the base adapted to be received in said opening in abutting relation to said wall, said base being connected to spaced opposed arms bent upwardly from said base, fingers carried by said opposed arms comprising strips integral with said arms at one end and having free end portions provided from the material of said arms and adjoining portions of the base, said fingers being bent to define outwardly projecting portions projecting bodily outwardly out of the planes of said arms above said base and portions bent inwardly in the general plane of the base and hook portions below said base having a normal spacing greater than the size of the opening in the support so as to engage marginal portions of said opening under tension, and means to retain a nut or bolt head on said base between said arms.

2. A sheet metal retainer for a bolt head comprising a base adapted to seat against a surface of a support over an opening having a noncircular wall, abutments projecting from the underside of the base adapted to be received in said opening in abutting relation to said noncircular wall, opposed tongues on said abutments extending inwardly toward each other for engaging the shank of a bolt, said base being connected to spaced opposed arms having free ends and bent upwardly from said base for engaging the head of said bolt in cooperation with said tongues, and fingers carried by said opposed arms comprising strips integral with said arms at one end and having free end portions provided from the material of said arms and adjoining portions of the base, said fingers being bent to define outwardly projecting portions extending normally out of the planes of said arms and portions bent inwardly in the general plane of the base and outwardly extending extremities defining hooks below said base having a normal spacing greater than the size of the opening in the support so as to engage marginal portions of said opening under tension.

GEORGE A. TINNERMAN.

REFERENCES CITED

The following references are of record in the file of this patent:

UNITED STATES PATENTS

| Number | Name | Date |
|---|---|---|
| 1,753,791 | Kiesel | Apr. 8, 1930 |
| 2,079,917 | Mitchel | May 11, 1937 |
| 2,079,918 | Mitchel | May 11, 1937 |
| 2,255,971 | Hall | Sept. 16, 1941 |
| 2,267,379 | Tinnerman | Dec. 23, 1941 |
| 2,290,939 | Brown | July 28, 1942 |
| 2,391,046 | Tinnerman | Dec. 18, 1945 |
| 2,400,545 | Kost | May 21, 1946 |
| 2,433,607 | Hallock | Dec. 30, 1947 |

FOREIGN PATENTS

| Number | Country | Date |
|---|---|---|
| 546,807 | Great Britain | July 30, 1942 |